United States Patent
Bueermann

(10) Patent No.: US 10,565,808 B2
(45) Date of Patent: Feb. 18, 2020

(54) METHOD AND APPARATUS FOR FAULT-REMEDYING, DEFECT-ELIMINATING OR MAINTENANCE WORK

(71) Applicant: Deere & Company, Moline, IL (US)

(72) Inventor: Martin Bueermann, Beckingen (DE)

(73) Assignee: Deere & Company, Moline, IL (US)

( * ) Notice: Subject to any disclaimer, the term of this patent is extended or adjusted under 35 U.S.C. 154(b) by 125 days.

(21) Appl. No.: 15/655,465

(22) Filed: Jul. 20, 2017

(65) Prior Publication Data

US 2018/0025561 A1 Jan. 25, 2018

(30) Foreign Application Priority Data

Jul. 25, 2016 (DE) .................. 10 2016 213 584

(51) Int. Cl.
*G07C 5/12* (2006.01)
*A01B 71/02* (2006.01)
*G01C 21/20* (2006.01)
*G07C 5/00* (2006.01)

(52) U.S. Cl.
CPC ............. *G07C 5/12* (2013.01); *A01B 71/02* (2013.01); *G01C 21/20* (2013.01); *G07C 5/006* (2013.01); *G07C 5/008* (2013.01); *G07C 2205/02* (2013.01)

(58) Field of Classification Search
CPC ........ A01B 71/02; G01C 21/20; G07C 5/006; G07C 5/008; G07C 5/12; G07C 2205/02; G05B 23/0272; G05B 23/0205; G05B 23/0218; G05B 23/0259; G05B 23/0262; G05B 23/0267; G05B 23/0283; G06Q 10/20

See application file for complete search history.

(56) References Cited

U.S. PATENT DOCUMENTS

2014/0240349 A1   8/2014  Tuukkanew
2015/0371455 A1*  12/2015 Abdel-Rahman ..... G06F 16/951
                                                      701/29.1

(Continued)

FOREIGN PATENT DOCUMENTS

DE  102015109203   12/2015
EP      1564688    8/2005
EP      2755099    7/2014

(Continued)

OTHER PUBLICATIONS

Brinkhaus, English translation for reference EP2755099A1 (Year: 2014).*
European Search Report for 17180700.1 dated Dec. 7, 2017.

*Primary Examiner* — Rachid Bendidi
(74) *Attorney, Agent, or Firm* — Rathe Lindenbaum LLP

(57) ABSTRACT

A method for guiding an operator of a mobile working machine (or a device coupled to the machine) to a position to be located for fault-remedying, defect-eliminating or maintenance work, by determining data in respect of the position that is to be located on the working machine (or the device coupled to the machine) using a diagnosis system, transmitting the data to a portable device in respect of the position that is to be located, and outputting direction instructions to the position based on the data, by virtue of the portable device in order to guide the portable device to the position that is to be located.

13 Claims, 2 Drawing Sheets

(56) References Cited

U.S. PATENT DOCUMENTS

2017/0124776 A1* 5/2017 Carpentier ......... G05B 23/0205
2017/0307465 A1* 10/2017 Yokono ................. G01M 3/24

FOREIGN PATENT DOCUMENTS

| EP | 2755099 A1 * | 7/2014 | ......... G05B 23/0267 |
| EP | 3000312 | 3/2016 | |
| EP | 3166054 | 5/2017 | |

* cited by examiner

METHOD AND APPARATUS FOR FAULT-REMEDYING, DEFECT-ELIMINATING OR MAINTENANCE WORK

FIELD OF THE INVENTION

The invention relates to a method, for assisting in finding a position on a mobile working machine (or a device which is coupled to said mobile working machine), which position is to be located for fault-remedying, defect-eliminating or maintenance work.

BACKGROUND

Modern working machines, such as construction machines or agricultural machines and, in particular, harvesting machines, are increasingly equipped with electronically controlled functions. Accordingly, they have electrically or electrohydraulically operated actuators which are actuated on the basis of sensor values or operator specifications which are manually input into an on-board computer. This electrical isolation and automation make it easier to operate the working machine, but also contain new sources of faults. Specifically, as soon as there is a fault in a sensor, an actuator, an input device, a controller or a line transmitting power or data, a function of the working machine or the entire working machine breaks down.

Working machines of this kind are usually equipped with on-board diagnosis or fault identification systems which can automatically identify faults of this kind. In the event of a fault, a corresponding fault message is displayed in the form of a so-called diagnostic trouble code (DTC) or in any desired other format to an operator by means of a display device. The operator can then check what this fault means in a printed or electronically available manual and possibly remedy said fault himself or request technical service.

EP 2,755,099 A1 proposes displaying a fault message of this kind as a machine-readable code on a display device of the on-board computer of the working machine. The operator can photograph this code using a portable device, which is a smartphone, a tablet computer or a notebook in particular, and call up further details relating to the fault and relating to remedying said fault in readable form in a local or online database. Accordingly, the operator learns which steps he can carry out in order to remedy the fault.

Furthermore, EP 1,332,658 A1 proposed equipping an operator of a harvesting machine with a handheld device with which he can move to a desired location of the harvesting machine and there trigger predefined test runs, which are associated with his respective relative position, of control parameters of the harvesting machine.

Although the known manuals for remedying faults, whether they are now present in printed or electronic form on the on-board computer or, in accordance with EP 2,755, 099 A1, on a portable device, are suitable for experienced operators and workshop personnel in order to find possible fault locations, inexperienced operators are often unable to do much with the instructions indicated there to check specific elements since they are unfamiliar with the referenced elements that are to be located. Even printed or displayed images with the referenced elements are not always of further help if, for example, there are a large number of very similar elements, such as electronic control units or the like. The procedure according to EP 1,332,658 A1 can help to find certain faults, but only under the condition that the operator already knows which locations he has to check. Accordingly, the operator already has to have sufficient experience with the respective machine in this case too.

Similar problems of finding specific positions on a working machine arise not only when finding and remedying faults, as described, but also when maintenance work is to be carried out or defects, such as blockages of harvested goods, are to be remedied. Inexperienced operators, as are often used particularly in the agricultural industry in harvest season, are hardly or in no way in a position to carry out such work. As a result, either the working machine is not used in an optimum manner, which can lead to further damage, or said working machine has to be stopped until qualified workshop personnel arrive.

The object of the present invention is that of providing a method, a portable device and a combination comprising a working machine and a portable device for assisting in finding a position on a working machine or a device which is coupled to said working machine, which position is to be located for fault-remedying, defect-eliminating or maintenance work, which method, portable device and combination do not have the mentioned disadvantages or have said disadvantages to a lesser extent and, in particular, allow an inexperienced operator to find a possibly faulty location on the working machine, in which location interference is to be suppressed or which location is to be serviced, relatively easily and to remedy the problem if possible.

SUMMARY OF THE INVENTION

In accordance with a first aspect of the invention, method for assisting in finding a position on a mobile working machine or a device which is coupled to said working machine, which position is to be located for fault-remedying, defect-eliminating or maintenance work, comprises the following steps:

ascertaining data in respect of a position that is to be located on the working machine or on a device which is coupled to said working machine by a diagnosis system, transmitting the data in respect of the calculated position to a portable device, and outputting direction instructions, which are based on the data, by virtue of the portable device for the purpose of guiding the portable device to the position of the faulty component.

In other words, a diagnosis system detects whether there is a fault with a component of the working machine, which is, for example, a construction machine or an agricultural machine and, in particular, a harvesting machine, or with a device which is associated with said component, and, respectively, whether maintenance work is to be carried out or a defect is to be eliminated. If there is a fault or a defect or maintenance work is required, data in respect of the position of the possibly faulty component or the defect or the maintenance work is also ascertained. Diagnosis procedures which are known per se are used in this case. For example, controllers can be equipped with diagnosis software and, in the event of a fault, send a corresponding fault code to the diagnosis system. Faults can also be detected by any desired sensors, for example unexpected positions of actuators or other elements, or faulty feedback from sensors or actuators are detected. Jams can be identified on the basis of drive torques in conveyors, for example by slip detection, and pending maintenance work can be detected in a manner which is known per se, for example on the basis of operating hours. A fault or a defect or maintenance work may be identified on the basis of the mentioned signals and a database of the diagnosis system. The diagnosis system can be located on board the working machine or remote from said working machine, for example on a stationary server to which the working machine continuously transmits the mentioned data and measurement values. In addition to the fault or the defect or maintenance work and the component in question, the associated position on the working machine or on the device are also entered into the database of the diagnosis system or another database which can be located on the working machine or at any desired other location. Data in respect of this position is transmitted to a portable device which can be embodied, in particular, as data goggles, a smartphone, a tablet computer or a notebook. This data may be information relating to the position that is to be located relative to a reference position on the working machine or any desired other data which allows the position that is to be located to be found. The portable device then outputs (acoustic or optical) direction instructions which allow the operator to guide the portable device to the position that is to be located and therefore reach this position himself. There, the operator can attempt to remedy the fault, this being possible in relatively simple cases, such as in the case of loose contacts on plug connectors, even without a special tool and replacement parts, or to eliminate the defect or to carry out the maintenance work. To this end, a suitable program (app) which can be downloaded to the portable device in a manner which is known per se in particular is stored in a memory of the portable device.

This makes it considerably easier to guide an operator to the position that is to be located since the operator does not require any or only little prior knowledge in respect of the details of the working machine and is nevertheless led to the desired location in a simple manner by the portable device. This procedure can be used firstly during use of the working machine by the operator of said working machine, and secondly also by workshop personnel in the workshop or at the site of use during repair or maintenance work.

The step of outputting direction instructions can include direction instructions which lead to a reference point first being output by the portable device, the situation of the reference point being reached by the portable device being verified and finally direction instructions which provide guidance from the reference point to the faulty component being output by the portable device. The operator and the portable device are therefore not led directly to the position that is to be located, but rather first to a reference point which can preferably be found relatively easily. Said reference point may be any desired point which is as prominent as possible, such as a marking on a longitudinal or transverse support or the like for example. There, it is first verified that the reference point has actually been reached, for example by the reference point being photographed by the portable device and data which is derived from the photograph being compared with stored data. The portable device and therefore also the operator are then led from the reference point to the faulty component.

The step of ascertaining a position that is to be located can include ascertaining a plurality of positions which come into question, such as in the case of a possibly faulty electrical line with a plurality of plug connectors. In this case, the operator is led by way of the portable device to the positions one after the other. There, said operator can confirm whether a fault has been found. If this is not the case, said operator is led to the next position, where the described process is repeated, until all positions have been addressed.

The step of transmitting data in respect of the position that is to be located to the portable device can comprise displaying a code on a display device which is connected to the on-board diagnosis system and a photograph being taken or the code being input by the portable device. The code allows the position that is to be located to be determined. The code can directly indicate the position that is to be located or only a general fault code. In the last-mentioned case, the portable device can ascertain the position that is to be located on the basis of a comparison of the read-in code with codes which are stored in the portable device and associated data in respect of the position that is to be located. A check of this kind can also be performed by the portable device by means of remote data transmission from an external database (for example by means of the Internet) or a database of the diagnosis system. It would also be feasible to transmit the data in respect of the position that is to be located from the on-board diagnosis system to the portable device in a wireless manner by means of any desired protocol, such as Bluetooth.

In order to guide the portable device to the position that is to be located, the working machine and the portable device can each be equipped with a position-determining system and the portable device can be supplied with position data by the working machine.

The portable device can show procedural instructions for remedying the fault to the operator after the position that is to be located has been reached.

BRIEF DESCRIPTION OF THE DRAWINGS

An exemplary embodiment of the invention which is described in more detail below is illustrated in the drawings.

DETAILED DESCRIPTION

Figure 1:
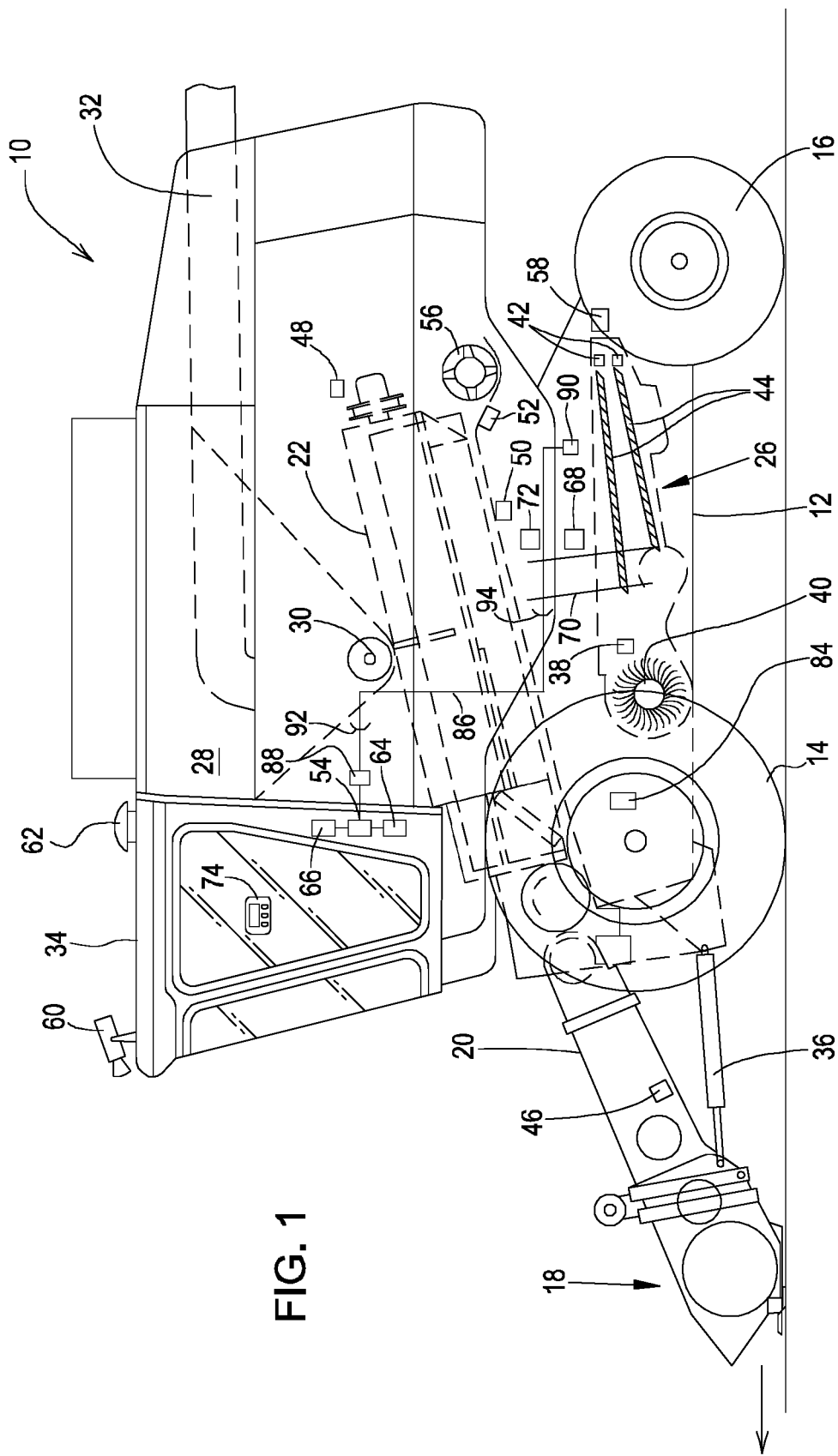
FIG. 1 shows a schematic side view of an agricultural working machine in the form of a combine harvester.

FIG. 1 shows a self-propelled and therefore mobile agricultural working machine 10 in the form of a combine harvester, having a running gear 12 which is supported on the ground by means of driven front wheels 14 and steerable rear wheels 16 and is propelled by said wheels. The wheels 14, 16 are set in rotation by drive means, not shown, in order to move the working machine 10, for example, over a field that is to be harvested or a road. In the text which follows, direction information, such as front and rear, relates to the direction of travel V of the combine harvester 10 during harvesting operation, which direction runs toward the left in FIG. 1.

A device in the form of a front-mounted harvesting attachment 18 in the form of a cutting unit is connected in a removable manner to the front end region of the combine harvester in order, during harvesting operation, to reap harvested goods in the form of grain or other threshable cereals from the field and to supply them upward and rearward through an oblique conveyor assembly 20 to an axial threshing unit 22. The mixture containing grains and impurities which passes through threshing baskets and grates in the axial threshing unit 22 passes into a cleaning device 26. Grain cleaned by the cleaning device 26 is supplied by means of a grain screw to a grain elevator which conveys said grain into a grain tank 28. The cleaned grain from the grain tank 28 can be discharged through a discharge system with a transverse screw 30 and a discharge conveyor 32. Said systems are driven by means of a combustion engine and are controlled by an operator from a driver's cab 34.

An on-board computer 54 controls (by means of valves which are not shown) the position of an actuator 36 for varying the height of the front-mounted harvesting attachment 18 above the ground, the position of an actuator 38 for adjusting the rotation speed of a fan 40 of the cleaning device 26, of two actuators 42 for adjusting the opening width of sieves or chaffers 44 of the cleaning device 26, and an actuator 84 for specifying the advancing speed of the combine harvester. A further actuator (not shown) which is controlled by the on-board computer 54 could specify the height of a reel of the front-mounted harvesting attachment 18. Furthermore, an actuator 48 controls the rotation speed of the axial threshing unit 22, and an actuator 50 adjusts the position of the threshing basket in order to set the size of the threshing gap. The mentioned actuators 36, 38, 42, 84, 48, 50 are adjusted by the on-board computer 54.

A throughput sensor 46 detects the throughput in the oblique conveyor assembly 20, for example on the basis of a drive torque of a chain conveyor of the oblique conveyor. A first grain loss sensor 52 detects the quantity of lost grains in the crop residue stream which is output by the axial threshing unit 22 and is output directly through a discharge drum 56 or by means of a straw chopper (not shown) to the rear of the combine harvester onto the field. A second grain loss sensor 58 detects the quantity of lost grains in the crop residue stream which is output from the upper screen of the cleaning device 26 and is output by the mentioned straw chopper or a separate chaff distributor onto the field. A camera 68 with an associated image-processing device is associated with a grain elevator 70 which takes the cleaned grain from the cleaning device 26 to the grain tank 28. A sensor 72 in the form of a near infrared spectrometer likewise looks into the grain elevator 70 in order to measure the proportion of contents of the grain which is conveyed into the grain tank 28, for example of proteins. The sensors 46, 52, 58 and 72 are connected to the on-board computer 54 in a signal-transmitting manner, this also being true of a forward-looking digital camera 60 which serves to detect the density of the harvested goods and the position of the edge of the harvested goods and transfers steering and speed specifications to the on-board computer 54 by means of image processing.

The on-board computer 54 is further connected to a memory device 64, a communications device 66, a position-determining device 62 in the form of an antenna for receiving signals from a satellite-based position-determining system and to an operator interface 74 with input means (buttons) and a display.

The on-board computer 54 communicates with the actuators 38 and 42 by means of an interface 88 and a communications bus 86 (which operates, for example, under any desired protocol, such as CAN or ISO 11783) and also a controller 90 which actuates the actuators 38 and 42 and is also connected to the sensors 52 and 58 and passes on the signals from said sensors to the on-board computer 54. A plurality of plug connections 92, 94 are inserted into the communications bus 86. Further controllers, not shown, are connected to the communications bus 86 and, for their part, to the other, above-mentioned actuators 36, 84, 48 and 50 and the sensors 46, 68 and 72.

Figure 2:
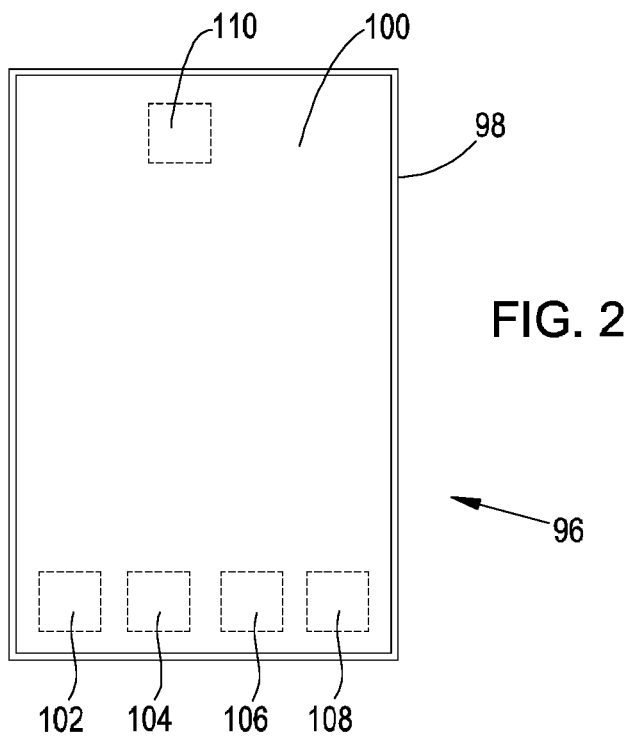
FIG. 2 shows a schematic view of a portable device.

FIG. 2 shows a portable device 96 which, in the embodiment shown, is a so-called smartphone. It comprises a housing 98 with a touch-sensitive display device 100, a digital microprocessor 102, an electronic memory circuit 104, a communications interface circuit 106, a position-determining system 108 and a digital camera 110. The portable device 96 could also be embodied as data goggles, a notebook, a laptop or a tablet computer. The memory circuit 104, communications interface circuit 106, position-determining system 108, and digital camera 110 are electronically coupled to the digital microprocessor 102 to be operated thereby.

Figure 3:
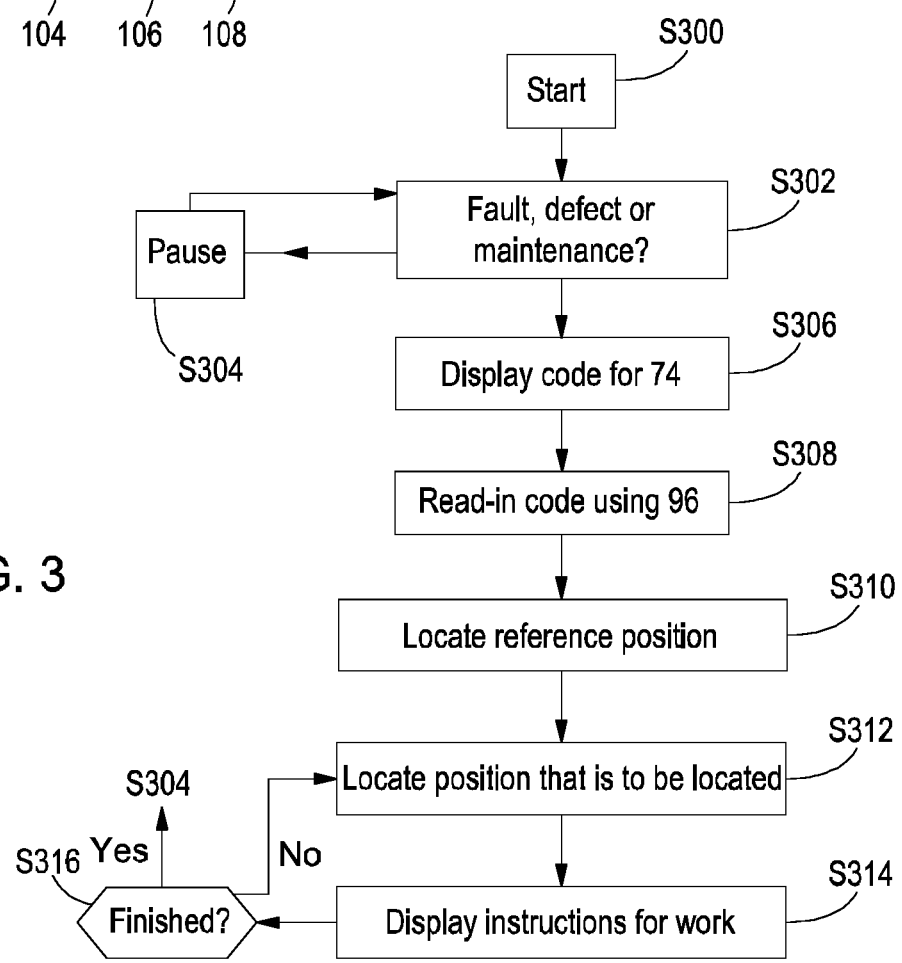
FIG. 3 shows a flowchart for a procedure for finding a specific position on the working machine for remedying faults or maintenance or eliminating defects.

The on-board computer 54 can only control the actuators 38 and 42 when the communications bus 86 functions correctly and, in particular, the plug connections 92, 94 operate correctly. The on-board computer 54 therefore serves in a manner which is known per se as an on-board diagnosis system of the working machine 10 too. In order to make it easier for the operator to find and to remedy any faults with the working machine 10, a procedure in line with the flowchart in FIG. 3 is followed.

After starting in step S300, the on-board computer 54 checks in step S302 whether there is a fault, a defect or pending maintenance work. In step S302, fault codes can be evaluated, which codes are transmitted by means of the communications bus 86 and can come, for example, from the controller 90 which possibly indicates that one of the sensors 52 or 58 is not emitting plausible values. The on-board computer 54 then identifies that there is a fault (for example in a plug connection) or a defect (for example harvested goods have collected in front of the sensor 52 or 58) with the sensor 52 or 58 in question. Analogously, the on-board computer 54 identifies if the communications bus 86 between the interface 88 and the controller 90 is interrupted. Analogously, the on-board computer 54 comprises an operating hours counter and identifies when maintenance work on specific components of the working machine 10 is necessary, for example lubrication at bearing points or cleaning work on filters. If it is found in step 302 that there is no fault and no defect and no maintenance work is required, the process returns to step S302 after a pause (step S304).

If, however, it is found in step S302 that certain work is to be carried out by the operator on the working machine 10 for eliminating faults or defects or for maintenance, said step is followed by step S306 in which the on-board computer 54 displays a code on the display of the operator interface 74. This code can be displayed as a barcode or QR code and/or in text form. The code contains information about the work to be carried out and the associated position.

In the following step S308, the operator has the option of reading-in the displayed code with the portable device 96, for which purpose he can use the camera 110. As an alternative or in addition, the code can also be transmitted by means of the communications device 66 of the working machine 10 and the communications interface circuit 106, which cooperates with it, of the portable device 96, or the operator can type in the code displayed in text form on the display of the operator interface 74 by means of the touch-sensitive display device 100.

In the following, optional step S310, the portable device 96 first leads the operator holding it to a reference position which can be located, for example, on the left-hand side of the working machine 10 on the elevator 70. A special marking, for example a barcode or QR code, can be provided at the reference position. In order to guide the operator, the portable device can display text instructions on the display device 100, said text instructions instructing the operator to move from the driver's cab 34 to the ground, to open the left-hand cover of the working machine 10 and to stand next to the working machine 10 approximately in the middle with respect to the forward direction. In addition, the display device 100 can display arrows which instruct the operator in respect of the direction in which he should move. Images which show, in a two-dimensional or perspective display, parts of the working machine 10 (or the entire working machine 10) and instructions, for example by highlighted parts of the working machine or arrows, as to where the operator should go in order to make it easier to find the reference position can also be displayed. As an alternative or in addition, the instructions can also be output in an acoustic manner.

In step S310, the portable device 96 requires information as to where in space it is located and where in space the working machine 10 and, in particular, the reference position are located. While in the case of the portable device 96, three-dimensional coordinates which can be obtained by means of the position-determining system 108 of said portable device suffice, in principle, for defining its position, the portable device requires both three-dimensional position data of a reference point on the working machine 10, which reference point is, for example, the position of the position-determining device 62, and also data relating to the orientation of the working machine 10 in space or in the horizontal plane, which data can be obtained by means of historical signals of the position-determining device 62 for tracking its path and therefore its orientation in space or in the horizontal plane and/or an inertial navigation system of the position-determining device 62 and/or a second position-determining device (not shown) of the working machine 10. This position and orientation data of the working machine 10 can be transmitted to the portable device 96 by means of the communications device 66 of the working machine 10 and the communications interface circuit 106, which cooperates with it, of said portable device.

The position-determining device 62 can be embodied as a receiver of signals from a satellite-based position-determining system (for example GPS, Galileo, Glonass) using correction signals. The position-determining system 108 can also be embodied as a receiver of signals from a satellite-based position-determining system (for example GPS, Galileo, Glonass) using correction signals, or it receives electromagnetic signals from ground-based reference points (for example masts for emitting mobile radio signals).

In another embodiment, it would also be feasible to attach a plurality of transmitters to the working machine 10, the position-determining system 108 identifying the relative position of the portable device 96 with respect to the working machine 10 on the basis of said plurality of transmitters. Purely optical detection of the relative position of the portable device 96 with respect to the working machine 10 by means of the camera 110 would also be feasible.

The situation of the reference position being reached in step S310 can be verified by the operator, when he believes he has reached the reference position, taking a photograph using the camera 110. The digital microprocessor 102 of the portable device 96 then compares the photograph taken (and in particular the mentioned marking) with a stored, expected photograph and outputs an instruction when the position is correct and otherwise outputs a fault message with instructions (preferably derived from the photograph taken and stored data and/or the actual position of the portable device 96, which position is detected by the position-determining system 108) to the operator as to how he should move the portable device 96 further.

Once the reference position (step S310) has been reached, this is followed by step S312 in which the operator is led in the manner described with respect to step S312 to the position that is to be located. If said position is reached, as can be verified analogously to the procedure described in relation to step S310, this is followed by step S314 in which the digital microprocessor 102 displays procedural instructions on the display device 100, which instructions can be displayed as words and/or images. Therefore, said processor can instruct the operator to check a plug connection 92, 94 or to clean a sensor 52, 58 or to clean a filter (not shown).

In the following step S316, the operator can make an entry into the touch-sensitive display device 100 of the portable device 96 as to whether he has carried out the proposed work. If this is the case, this is followed by step S304 again and otherwise by step S312 in which the portable device 96 now leads the operator to another position that is to be located. In this way, the operator can be guided to all of the plug connections 92, 94 one by one if a fault in the communications bus 86 has been established in step S302.

As an alternative or in addition, the check as to whether the work has been successfully carried out can be performed by the on-board computer 54 in step S316. Therefore, in the case of the example of the faulty communications bus 86, after checking of the plug connection 92 and entry into the portable device 96, said portable device can make a corresponding confirmation on the on-board computer 54 (by means of the communications interface circuit 106 of the portable device 96 and the communications device 66, which cooperates with it, of the working machine 10), which on-board computer then checks whether the communications bus 86 is now operating correctly. If this is the case, the on-board computer 54 responds to the portable device 96 and, after a corresponding instruction to the operator by means of the display device 100 that the work has been successfully completed, this is followed by step S304, whereas otherwise step S312 is performed once again and the operator is led by the portable device 96 to the other plug connection 94. Analogously, the on-board computer 54 can also check, for example on the basis of the signals from the camera 68, whether the operator has correctly cleaned a window of the camera 68 in the event of soiling or whether this process has to be repeated.

In light of the above, the portable device 96 which is provided according to the invention and programmed in the described manner also allows an inexperienced operator to locate a difficult to find position on the working machine 10 or a device which is connected to said working machine, such as the front-mounted harvesting attachment 18, in a simple manner and carry out work there, in particular for remedying faults, maintenance or eliminating defects. The portable device 96 can cooperate with the on-board computer 54, which serves as a diagnosis system, in an interactive manner in order to check whether the work has been carried out correctly and successfully.

The invention claimed is:
1. A method for guiding an operator to a position on a mobile working machine or a device which is coupled to said mobile working machine, which position is to be located for fault-remedying, defect-eliminating or maintenance work, comprising the following steps:
    ascertaining, with at least one computing device, data in respect of the position that is to be located on the working machine or on the device which is coupled to said working machine using a diagnosis system, transmitting, with the at least one computing device, the data in respect of the position that is to be located to a portable device, and outputting, with the at least one computing device, direction instructions, which are based on the data, by virtue of the portable device for the purpose of guiding the portable device to the position that is to be located, wherein the step of outputting direction instructions includes direction instructions which lead to a reference point first being output by the portable device, the situation of the reference point being reached by the portable device being verified and finally direction instructions which provide guidance from the reference point to the position that is to be located being output by the portable device, wherein the provision of guidance from the reference point to the position comprises directing the portable device from the reference point at a first location and orientation at which the position is concealed to a second different location and/or orientation at which the position is viewable;

verifying, with the at least one computing device, that the portable device is at the reference point, wherein the provision of guidance from the reference point to the position is in response to completion of the verifying that the portable device is at the reference point, wherein the verifying that the portable devices at the reference point comprises:

capturing an image at a candidate reference point with the portable device;

comparing the image with stored data at the reference point to determine whether the candidate reference point is the reference point, wherein the image is of a marking identifying the reference point.

2. The method as claimed in claim 1, wherein the step of verifying that the reference point has been reached includes the reference point being photographed by the portable device and data which is derived from the photograph taken being compared with stored data.

3. The method as claimed in claim 1, wherein the step of ascertaining data in respect of the position that is to be located includes ascertaining a plurality of positions which come into question.

4. The method as claimed in claim 1, wherein the step of transmitting data in respect of the position that is to be located to the portable device comprises displaying a code on a display device which is connected to the diagnosis system and a photograph being taken by or the code being input into the portable device.

5. The method as claimed in claim 1, wherein the portable device and the working machine are each equipped with a position-determining system, and the portable device receives position data from the working machine.

6. The method as claimed in claim 1, wherein the portable device shows procedural instructions to the operator after the position that is to be located has been reached.

7. The method as claimed in claim 1, wherein the portable device cooperates with the diagnosis system in an interactive manner in order to check the success of the work which was carried out at the position by the operator.

8. The method of claim 7, wherein the checking the success of the work comprises the working machine sensing a state of the working machine at the position following completion of the work.

9. The method of claim 1, wherein the position is concealed at the reference point and wherein the method further comprises directing repositioning of a cover so as to render the position viewable from the reference point.

10. The method of claim 1, were in the marking comprise a marking selected from a group of markings consisting of a barcode and a QR code.

11. A portable device for assisting in finding a position on a working machine or a device for fault-remedying, defect-eliminating or maintenance work, wherein the working machine is equipped with a diagnosis system which is programmed to calculate the position, the portable device comprising a digital microprocessor programmed to:

receive data in respect of the position that is to be located;

output direction instructions, which are based on the data, for guiding the portable device to the position, wherein the direction instructions lead to a reference point;

verify that the portable device is at the reference point by:

capturing an image at a candidate reference point with the portable device;

comparing the image with stored data at the reference point to determine whether the candidate reference point is the reference point, wherein the image is of a marking identifying the reference point; and in response to completion of the verifying that the portable device is at the reference point, output direction instructions which provide guidance from the reference point to the position, wherein the provision of guidance from the reference point to the position comprises directing the portable device from the reference point at a first location and orientation at which the position is concealed to a second different location and/or orientation at which the position is viewable.

12. The portable device of claim 11, wherein the output direction instructions direct repositioning of the cover so as to render the position viewable.

13. A combination comprising:

a working machine which is equipped with a diagnosis system which is programmed for calculating a position on the working machine or on a device for fault-remedying, defect-eliminating or maintenance work, wherein the working machine is equipped with a diagnosis system which is programmed to calculate the position; and a portable device for assisting in finding the position, the portable device comprising a digital microprocessor to receive satellite-based position data indicating a location of the portable device in space and to receive data in respect of the position and to output direction instructions based upon the satellite-based position data and the position for the purpose of guiding the portable device to a prominent reference point proximate the position, wherein the digital microprocessor is to further:

output direction instructions, which are based on the data, for guiding the portable device to the position, wherein the direction instructions lead to a reference point;

verify that the portable device is at the reference point by:

capturing an image at a candidate reference point with the portable device;

comparing the image with stored data at the reference point to determine whether the candidate reference point is the reference point, wherein the image is of a marking identifying the reference point; and in response to completion of the verifying that the portable device is at the reference point, output direction instructions which provide guidance from the reference point to the position, wherein the provision of guidance from the reference point to the position comprises directing the portable device from the reference point at a first location and orientation at which the position is concealed to a second different location and/or orientation at which the position is viewable.

* * * * *